3,055,855
PROCESS FOR EMULSION POLYMERIZATION OF BUTADIENE - UNSATURATED CARBOXYLIC ACID COPOLYMERS AND PRODUCT THEREOF
Harvey L. Anderson, Lincoln Township, Washington County, and Harold T. Wingfield, White Bear Lake, Minn., assignors to Minnesota Mining and Manufacturing Company, St. Paul, Minn., a corporation of Delaware
No Drawing. Filed Mar. 2, 1959, Ser. No. 796,235
8 Claims. (Cl. 260—29.7)

The present invention relates to polymerization processes and more particularly to a process for the emulsion copolymerization of butadiene and certain ethylenically unsaturated carboxylic acids.

This application is a continuation-in-part of our copending application Serial No. 652,633, filed April 12, 1957, now abandoned.

Polymerization by means of emulsion systems yields latices which are very useful in the adhesive, paper coating, paint and the like arts. Particularly useful polymers thus prepared are the synthetic elastomers, and a very useful copolymer having superior properties which would be very desirable in the named arts is the copolymer of butadiene with certain unsaturated acids in the form of a latex. However, previous attempts to copolymerize butadiene and unsaturated acids in emulsion systems to produce useful latexes have been quite unsatisfactory. In both anionic and non-ionic systems the rates of conversion to latex have been unsatisfactory. While satisfactory rates of copolymerization have been attained in specific cationic systems in which dodecylamine hydrochloride was used as the emulsifying agent, the latexes resulting from these cationic systems have been very unstable, and consequently of little practical utility as such. For example, in butadiene-acrylic acid systems which are emulsion polymerized using dodecylamine hydrochloride as the emulsifying agent, the resulting latex often coagulates even in the polymerization vessel under the influence of the mechanical action of the stirrer; or shortly after having been removed from the polymerization vessel under the influence of temperature changes.

Objects of the present invention are to provide an efficient process for the emulsion copolymerization of butadiene and certain unsaturated acids, and to produce by that process latexes which are highly stable to variations in pH and temperature, to mechanical forces and movement, to storage or aging, and the like. Another object of the invention is to provide an emulsion polymerization process by which the monomers of butadiene and certain unsaturated acids are relatively easily copolymerizable in a considerably wider range of monomer ratios than has been possible heretofore. Other objects will appear from the disclosure hereinafter made.

In accordance with the above and other objects of the invention, highly stable emulsion copolymers of butadiene and ethylenically unsaturated acids are produced by an efficient and inexpensive process, whereby the emulsion polymerization of butadiene and unsaturated acids is carried out in aqueous medium in the presence of an acid-stable anionic emulsifying agent and from about 5 percent to about 20 percent (based on the total monomer weight) of certain inorganic salts. Such salts include the hydrochloric, sulphuric, nitric and phosphoric acid salts of metals of the group consisting of sodium, potassium, lithium, calcium and magnesium.

It is known that soluble salts have been used to reduce the freezing point of aqueous systems for emulsion polymerization, to enable lower process temperatures to be used. Salts have also been used for their catalytic effect. These effects do not appear to enter into the process of the present invention, which is carried out at temperatures well above the freezing point. Soluble salts have also been used to coagulate latices.

The mechanism, by which the addition of a salt of the class described, supra, to the anionic emulsion copolymerization recipe of butadiene and ethylenically unsaturated acid monomers causes the polymerization to proceed smoothly to a satisfactory product, is obscure, as is the reason for the general difficulty heretofore experienced in handling this monomer system as compared, for example, with the butadiene-acrylonitrile monomer system and with the butadiene-styrene monomer system. It may be that the unfavorable distribution ratio of the unsaturated acid monomer between the aqueous emulsion medium and the micelle (the acid monomer being much more soluble in the medium than in the micelle) is rendered more favorable by the addition of the salt to the medium, thereby rendering the unsaturated acid monomer less soluble in the medium and relatively more soluble in the micelle. Another possible explanation is that in the absence of the salt, the unsaturated acid monomer alters the micelles so that they can no longer act as polymerization sites, while in the presence of the salt the micelles are not so altered. Regardless of the validity of these theories, which do not in any way limit the scope of the invention, the process produces latexes at polymerization rates up to 50 times greater than has been possible heretofore, which are remarkably stable. They are highly resistant to coagulation by mechanical shear, aging, freezing and the like.

The ethylenically unsaturated acids useful in the process of the invention can be represented by the formula

wherein R represents a member of the group consisting of hydrogen, methyl and phenyl radicals and R' represents a member of the group consisting of hydrogen, chlorine and the methyl radical.

Among such unsaturated acids which can be copolymerized with butadiene to form useful latexes within the scope of the invention are: acrylic acid, methacrylic acid, α-chloro-acrylic acid, crotonic acid, α-methyl-crotonic acid, α-chloro-crotonic acid and cinnamic acid. Mixtures of these acids can, if desired, be employed in the practice of the invention. These unsaturated acids are additionally characterized by their property of being capable of undergoing free radical-initiated copolymerization with butadiene.

Examples of the salts which are suitable for use in the process of the invention are sodium chloride, potassium chloride, lithium chloride, sodium sulphate, sodium phosphate, potassium nitrate, magnesium phosphate, calcium chloride and magnesium sulphate. The salt which is chosen must be water-soluble in the amount used, and sodium sulphate is the presently preferred salt.

Amounts of the salts coming within the scope of the invention ranging from about 5 to about 20 percent of the total weight of the monomers used can be employed in the process of the invention. Preferably, about 5 to 10 percent of the selected salt is employed, based on monomer weight.

The anionic emulsifying agents which can be employed in the process of the invention are such emulsifiers which are stable to at least pH 2. The acidity of the acrylic monomer which is employed herein is such that emulsifying agents not meeting the requirement will be precipitated or will lose their emulsifying power in some other way. Emulsifying agents which are stable to acid to about pH 2, and which are useful in the process of the invention, include alkali metal salts of higher alkyl sulfates such as sodium lauryl sulfate and sodium 7-ethyl-2-methylundecanyl sulfate; alkali metal salts of alkyl aryl polyether sulfonates, such as sodium nonyl phenyl polyoxaethylene sulfonate containing an average of about 12 condensed ethylene oxide units; alkali metal salts of hemiacylamidoalkanol esters of sulfosuccinic acid, such as sodium monolaurylamidoisopropyl sulfosuccinate; and the like.

Commercially available acid-stable anionic emulsifying agents which are suitable for use in the present invention are the sodium sulfate derivative of 7-ethyl-2-methyl-undecanol-4, marketed under the trademark "Tergitol 4"; the sodium salt of an alkyl aryl polyether sulfonate, marketed under the trademark "Triton X–200," and an acylamidoisopropyl hemi-ester of the sodium salt of sulfosuccinic acid of the formula:

wherein $x$ is a number of average value about 12, marketed under the trademark "Emcol K-8300." Sodium lauryl sulfate is the preferred emulsifying agent for use in the present process.

The polymerization process of the invention can be carried out at any temperature in the range of about 25° C. to 75° C. Preferably, the temperature used is of the order of about 45–55° C.

As is well known in the art, modifiers may be added to the polymerization system to control the chain length of the copolymers which are formed. Such modifiers include mercaptans, for example, alkylmercaptans having from 8 to 16 carbon atoms. However, such modifiers need not be employed and in some cases, as where longer chain length is useful, they are preferably not used.

The polymerization of the co-monomers is brought about by the action of a free radical-producing catalyst which will form free radicals at a temperature in the range of about 25° C. to 75° C. Illustrative catalysts are the alkali metal persulfates, benzoyl peroxide, benzoin, biacetyl, azobis-butyronitrile, ultraviolet light and the like.

The stable latexes produced by the present invention have many varied uses in the plastics, paper, paint and coating and adhesive arts. They may, for example, be suitably compounded and filled to produce latex paints. A second specific area of utility of these latexes is in providing wet-strength to paper. Thus, they can be added to paper pulp in order to impart wet-strength properties to paper produced from that pulp; or they can be used to saturate paper after it is already formed, to achieve a similar result.

In order to disclose the nature of the present invention more clearly, the following specific examples illustrating the process are set forth. It should be understood, however, that this is done solely by way of example and is intended neither to delineate the scope of the invention nor limit the ambit of the appended claims. All parts are by weight unless otherwise specified.

In the examples, the procedure used (except where otherwise specified) is as follows: the ingredients of the charge are added in the amounts shown to a pressure vessel in the following order: distilled water, emulsifying agent, the salts as previously defined, the polymerization catalyst, a modifier, if desired (e.g. tertiary dodecyl mercaptan), the unsaturated acid monomer and finally butadiene. The butadiene is conveniently added in slight excess and at least a portion of the excess allowed to vaporize, in order to purge the vessel of oxygen. The vessel is then sealed and the contents are agitated under controlled temperatures for about 17 or 18 hours.

*Example 1*

A charge of 180 parts of water, 5 parts of sodium lauryl sulfate, various salts as shown in the table, infra, 0.3 part of potassium persulfate, 0.5 part of tertiary-dodecyl mercaptan, 10 parts of acrylic acid and 90 parts of butadiene is placed in crown-capped pressure bottles which are then placed in an end-over-end rotating apparatus in a water bath for 18 hours at 50° C. The results of these runs are summarized in the table. Stable latexes are produced in each case, except the control.

| Salt | Parts Salt | Percent Conversion to Emulsified Polymer |
|---|---|---|
| None | | < 5 (unstable) |
| Sodium Chloride | 5 | 45 |
| Do | 10 | 59 |
| Sodium Sulfate | 5 | 56 |
| Do | 10 | 72 |
| Sodium Phosphate | 5 | 61 |
| Potassium Chloride | 5 | [1] 42 |
| Potassium Nitrate | 5 | 15 |
| Do | 10 | 39 |
| Lithium Chloride | 5 | 36 |
| Magnesium Sulfate | 5 | 66 |
| Magnesium Phosphate | 5 | 60 |

[1] Run for 16.5 hours.

*Example 2*

Water 180 parts, 5 parts of sodium lauryl sulfate, 5 parts of sodium sulfate, 1 part of potassium persulfate, 0.5 part of tertiary-dodecyl mercaptan and various amounts of acrylic acid and butadiene as shown in the table, infra, are charged to crown-capped pressure bottles which are then placed in an end-over-end rotating apparatus in a water bath for the periods noted in the table at 55° C. The results of these runs are summarized as follows:

| Parts Acrylic Acid | Parts Butadiene | Reaction Time, hrs. | Percent Conversion |
|---|---|---|---|
| 3 | 97 | 16 | 60 |
| 5 | 95 | 18 | 70 |
| 10 | 90 | 20 | 79 |
| 15 | 85 | 17 | 80 |
| 15 | 85 | 21 | 86 |
| 30 | 70 | 17 | 36 |
| 50 | 50 | 17 | 28 |

Conversions of about 90 percent are obtained with all of these monomer ratios by increasing the reaction time. If no sodium sulfate (or comparable salt as described herein) is incorporated, monomer ratios richer in acrylic acid than about 10 parts acrylic acid to 90 parts butadiene are polymerizable only with great difficulty and with low yields of latex of poor quality.

*Example 3*

Water, 180 parts, 5 parts of sodium lauryl sulfate, 5 parts of sodium sulfate, 1 part of potassium persulfate, 0.5 part of tertiary-dodecyl mercaptan, 10 parts of an unsaturated acid as shown in the table, infra, and 90 parts of butadiene are charged to crown-capped pressure bottles which are then placed in an end-over-end rotating apparatus in a water bath for about 17½ hours at 55° C. A stable latex is obtained in each case. The efficiencies of conversion of these runs are as follows.

Unsaturated acid:      Percent conversion
    Methacrylic acid _____ 83
    Cinnamic acid _____ 64
    Sorbic acid _____ 70

Similarly, when like amounts of α-chloro-acrylic acid, α-methyl-crotonic acid, crotonic acid and α-chloro-crotonic acid are copolymerized with butadiene in the same way, stable latexes are obtained in useful amounts. Calcium chloride can be substituted for the sodium sulfate at the stated temperature, to produce like results.

*Example 4*

In order to compare the stability of 90:10 butadiene acrylic acid copolymer emulsions prepared in a cationic system with those prepared in an anionic system according to the present invention, an attempt was made to prepare two comparable latex lots as follows:

(1) A 20 gallon glass lined, jacketed reaction vessel equipped with a stirrer was successively charged with 99 pounds (180 parts) of water, 2.75 pounds (5 parts) of dodecylamine-hydrochloride, 0.165 pound (0.3 part) of potassium persulfate, .275 pound (0.5 part) of tertiary-dodecyl mercaptan, 5.5 pounds (10 parts) of acrylic acid and 49.5 pounds (90 parts) of butadiene. The reaction mixture was stirred for 17 hours during which time the temperature was maintained at about 45° C. The reaction vessel was then opened; the contents were found to have coagulated completely and were removed therefrom with difficulty.

In order to prepare a latex using dodecylamine hydrochloride as an emulsifier, several 7 ounce crown-cap bottles were then each charged with 180 parts of water, 5 parts of dodecylamine hydrochloride, 0.3 part of potassium persulfate, 0.5 part of tertiary dodecyl mercaptan, 10 parts of acrylic acid and 90 parts of butadiene. The bottles were placed in an end-over-end rotating apparatus in a water bath for 17 hours at 45° C. A good conversion was realized under these conditions.

(2) A 20 gallon glass lined, jacketed reaction vessel equipped with a stirrer was successively charged with 99 pounds (180 parts) of water, 2.75 pounds (5 parts) of sodium lauryl sulfate, 2.75 pounds (5 parts) of sodium sulfate, .55 pound (1 part) of potassium persulfate, .275 pound (0.5 part) of tertiarydodecyl mercaptan, 5.5 pounds (10 parts) of acrylic acid and 49.5 pounds (90 parts) of butadiene. The reaction mixture was stirred for about 17 or 18 hours during which time the temperature was maintained at 55° C. A conversion of 76 percent was realized.

The latexes thus prepared were subjected to various conditions and their stability observed. The results of these tests are summarized in the table.

| Condition | (1) Dodecylamine-Hydrochloride Latex | (2) Sodium Sulfate-Sodium Lauryl Sulfate Latex |
| --- | --- | --- |
| Variation in pH | Coagulates if pH is raised to 7.5 or above. | Stable at least between pH 2.5 and pH 11.0. |
| Storage at 40° F | Evidence of gelation and solidification in less than 2 weeks. | No change after 1 year. |
| Freezing and thawing latex. | Coagulated on thawing. | Did not coagulate on thawing. |
| Shear (Mechanical agitation). | Easily coagulated under mechanical agitation. | Stable under severe mechanical agitation. |
| Processing (emulsion polymerizing). | Difficult to polymerize because of poor stability and tendency to precoagulate (aggravated by agitation). | No precoagulum formed even under extreme agitation. |
| Squeeze roll stability in paper saturation. | Polymer coagulates on squeeze roll; requires frequent shut down and clean-up. | No polymer coagulates on squeeze roll. |

What is claimed is:

1. A process for producing a stable latex consisting essentially of water and a copolymer of from about 50 to 97 percent by weight of monomeric butadiene and from about 50 to 3 percent by weight of a monomeric alpha-beta-unsaturated carboxylic acid represented by the formula:

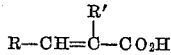

wherein R is a member of the group consisting of hydrogen, methyl and phenyl radicals and R' is a member of the group consisting of hydrogen, chlorine and the methyl radical: said process comprising the steps of preparing an aqueous emulsion, containing the said monomers; an acid stable anionic emulsifying agent selected from the group consisting of alkali metal salts of higher alkyl sulfates, alkyl aryl polyether sulfonates and hemiacylamidoalkanol esters of sulfosuccinic acid; a free-radical-producing catalyst for the polymerization; and from about 5 to 20 percent by weight, based on the total amount of monomer present, of a water-soluble salt selected from the group consisting of the chloride, sulfate, nitrate and phosphate salts of sodium, potassium, lithium, calcium and magnesium; and agitating the said emulsion at a temperature in the range of about 25° C. to 75° C. until a significant amount of a polymeric latex has formed.

2. The process according to claim 1 wherein the salt is present in solution in the polymerization mixture to the extent of from about 5 percent to about 10 percent of the total monomer weight.

3. The process according to claim 1 wherein the salt is sodium sulfate.

4. The process according to claim 1 wherein the acid is acrylic acid.

5. The process according to claim 1 wherein the emulsifier is sodium lauryl sulfate.

6. The process according to claim 3 wherein the acid is acrylic acid and the emulsifier is sodium lauryl sulfate.

7. An aqueous copolymeric latex of from about 50 to 97 percent by weight of butadiene and from about 50 to 3 percent by weight of acrylic acid formed by preparing an aqueous emulsion containing the said monomers; an acid stable anionic emulsifying agent selected from the group consisting of alkali metal salts of higher alkyl sulfates, alkyl aryl polyether sulfonates and hemiacylamidoalkanol esters of sulfosuccinic acid; a free radical-producing catalyst for the polymerization; and from about 5 to 20 percent by weight, based on the total amount of monomer present, of a water-soluble salt selected from the group consisting of the chloride, sulfate, nitrate and phosphate salts of sodium, potassium, lithium, calcium and magnesium; and agitating the said emulsion at a temperature in the range of about 25° C. to 75° C. until a significant amount of a polymeric latex has formed.

8. An aqueous copolymeric latex of from about 50 to 97 percent by weight of butadiene and from about 50 to 3 percent by weight of an alpha-beta-unsaturated carboxylic acid represented by the formula:

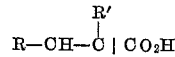

wherein R is a member of the group consisting of hydrogen, methyl and phenyl radicals and R' is a member of the group consisting of hydrogen, chlorine and the methyl radical, said latex being formed by preparing an aqueous emulsion containing the said monomers; and acid stable anionic emulsifying agent selected from the group consisting of alkali metal salts of higher alkyl sulfates, alkyl aryl polyether sulfonates and hemiacylamidoalkanol esters of sulfosuccinic acid; a free-radical-producing catalyst for the polymerization; and from about 5 to 20 percent by weight, base on the total amount of monomer present, of a water-soluble salt selected from the group consisting of the chloride, sulfate, nitrate and phosphate salts of sodium, potassium, lithium, calcium and magnesium; and agitating the said emulsion at a temperature in the range of about 25° C. to 75° C. until a significant amount of a polymeric latex has formed.

References Cited in the file of this patent

UNITED STATES PATENTS

| | | |
| --- | --- | --- |
| 2,416,461 | Stewart | Feb. 25, 1947 |
| 2,444,801 | Arundale | July 6, 1948 |
| 2,615,009 | St. John | Oct. 21, 1952 |
| 2,694,053 | Uraneck et al. | Nov. 9, 1954 |
| 2,706,192 | Hoag | Apr. 12, 1955 |
| 2,802,799 | Johnson | Aug. 13, 1957 |
| 2,822,341 | Miller | Feb. 4, 1958 |
| 2,952,043 | Uraneck et al. | Sept. 13, 1960 |
| 2,959,821 | Kolb | Nov. 15, 1960 |

UNITED STATES PATENT OFFICE
CERTIFICATE OF CORRECTION

Patent No. 3,055,855                  September 25, 1962

Harvey L. Anderson et al.

It is hereby certified that error appears in the above numbered patent requiring correction and that the said Letters Patent should read as corrected below.

Column 6, between lines 40 and 45, the formula should appear as shown below instead of as in the patent:

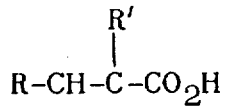

same column 6, line 55, for "base" read -- based --.

Signed and sealed this 30th day of April 1963.

(SEAL)
Attest:

ERNEST W. SWIDER
Attesting Officer

DAVID L. LADD
Commissioner of Patents